United States Patent [19]

Kretschmer, Jr.

[11] Patent Number: 4,734,699
[45] Date of Patent: Mar. 29, 1988

[54] DOPPLER-IMPROVED POLYPHASE PULSE EXPANDER-COMPRESSOR

[75] Inventor: Frank F. Kretschmer, Jr., Laurel, Md.

[73] Assignee: The United States of America as represented by the Secretary of the Navy, Washington, D.C.

[21] Appl. No.: 848,880

[22] Filed: Apr. 7, 1986

[51] Int. Cl.⁴ ............................................. G01S 13/28
[52] U.S. Cl. .................................................... 342/201
[58] Field of Search ............... 342/131, 132, 134, 135, 342/194–196, 202–204, 201

[56] References Cited

U.S. PATENT DOCUMENTS

| | | | |
|---|---|---|---|
| 3,095,541 | 6/1963 | Ashcraft | 342/203 X |
| 3,333,268 | 7/1967 | Brocato et al. | 342/201 |
| 3,618,095 | 11/1971 | Darlington | 342/201 |
| 3,680,105 | 7/1972 | Goldstone | 342/194 |
| 3,731,311 | 5/1973 | Williams | 342/201 |
| 4,028,700 | 6/1977 | Carey et al. | 342/194 |
| 4,053,889 | 10/1977 | Johnson | 342/201 |
| 4,110,755 | 8/1978 | Zottl | 342/132 X |
| 4,119,963 | 10/1978 | Zwarts et al. | 342/201 X |
| 4,237,461 | 12/1980 | Cantrell et al. | 342/194 |
| 4,309,703 | 1/1982 | Blahut | 342/132 X |
| 4,359,735 | 11/1982 | Lewis et al. | 342/194 |
| 4,359,779 | 11/1982 | Levine | 342/201 X |
| 4,373,190 | 2/1983 | Lewis et al. | 364/715 |
| 4,379,295 | 4/1983 | Lewis et al. | 342/201 |
| 4,384,291 | 5/1983 | Lewis et al. | 342/196 |

Primary Examiner—Theodore M. Blum
Assistant Examiner—Bernarr Earl Gregory
Attorney, Agent, or Firm—Thomas E. McDonnell; John L. Forrest

[57] ABSTRACT

A method and apparatus for reducing cyclic losses due to doppler shifting of frequency-derived phase coded expanded radar pulses using new expanded pulse codes which increase the number of phase elements without increasing compression ratios. These new expanded codes may be generated by sampling the phase characteristics of a chirp or step-chirp waveform above the Nyquist rate to derive the phases of the new coded waveforms and compressing the new expanded pulses with a compression ratio equal to the reciprocal of the signal bandwidth.

19 Claims, 5 Drawing Figures

IMPLEMENTATION OF A 32 ELEMENT CODE (STEP-CHIRP PHASE OVERSAMPLED BY 2).
PULSE COMPRESSION RATIO = 16.

PEAK SIGNAL RESPONSE OF A 100 ELEMENT COMPRESSED FRANK CODE. PULSE COMPRESSION RATIO = 100.

COMPRESSED 100 ELEMENT FRANK CODE. PULSE COMPRESSION RATIO = 100.

COMPRESSED 200 ELEMENT CODE (STEP-CHIRP PHASE OVERSAMPLED BY 2). PULSE COMPRESSION RATIO = 100.

PEAK SIGNAL RESPONSE OF A 200 ELEMENT COMPRESSED CODE (STEP-CHIRP PHASE OVERSAMPLED BY 2). PULSE COMPRESSION RATIO = 100.

IMPLEMENTATION OF A 32 ELEMENT CODE (STEP-CHIRP PHASE OVERSAMPLED BY 2).
PULSE COMPRESSION RATIO = 16.

DOPPLER-IMPROVED POLYPHASE PULSE EXPANDER-COMPRESSOR

BACKGROUND OF THE INVENTION

This invention relates to pulse-type, peak-power limited radar systems, and particularly to methods and apparatus for frequency-derived pulse compression techniques used in peak-power limited radar systems.

Two methods of reducing cyclic loss of frequency-derived polyphase coded signals due to doppler shift are known in the art. One method requires two channels instead of one, the first of them a standard direct channel, and the second comprising a phase-compensated channel which has approximately a $\pi$ phase shift across the uncompressed pulse. The channel having the largest signal is then selected. This method is undesirable from the standpoint of cost and complexity associated with the additional phase shifters, channel and signal-selecting circuitry required.

The other known method of reducing cyclic loss due to doppler shift is amplitude weighting of the polyphase-coded signal. The undesirable aspects of this method are the limited degree of reduction in cyclic losses attributable solely to weighting and the reduction in signal-to-noise ratio which results from the general practice of weighting the received polyphase-coded signal.

OBJECTS OF THE INVENTION

Accordingly, one object of the present invention is to reduce cyclic loss due to doppler shift in frequency-derived polyphase compression codes.

Another object of the present invention is to reduce cyclic losses due to doppler shift in such codes with a minimum of hardware and complexity.

Yet another object of the invention is to reduce cyclic losses due to doppler shift in such codes without suffering substantial reduction in the signal-to-noise ratio of the received signal.

SUMMARY OF THE INVENTION

The present invention achieves a reduction in cyclic losses due to doppler shift in frequency-derived polyphase compression codes, such as the Frank, P1, P2, P3 and P4 codes, by altering the code. The modified code phases are derived by sampling the phase characteristics of an underlying chirp or step-chirp waveform at a rate which is higher than the Nyquist rate, thereby increasing the number of code elements within the uncompressed pulse length. These codes are no longer the same codes as before, but they are referred to as oversampled versions of the well known prior codes (e.g. oversampled Frank code). The cyclic losses decrease as the sampling rate increases. The oversampled codes may be expanded and compressed using a variation of the usual DFT (discrete fourier transform) or FET (fast fourier transform) phase filter procedures. Although amplitude weighting may be required to reduce the higher resulting sidelobe peaks, there is a significant increase in the resultant signal-to-noise ratio of the doppler shifted signal even with amplitude weighting.

The foregoing, as well as other objects, features and advantages of the invention will be apparent from the following descriptions of the preferred embodiment of the invention, and the novel features will be particularly pointed out hereinafter in connection with the appended claims.

DETAILED DESCRIPTION OF THE INVENTION

In the preferred embodiment, the phase characteristics of a chirp or step-chirp waveform having a bandwidth B are sampled at a rate corresponding to k times with the Nyquist rate to derive the phases of the polyphase codes. The Nyquist rate at baseband has a frequency of B and k is a factor greater than 1. The sampled signal is then expanded and compressed by modifying the procedure for expanding and compressing polyphase codes sampled at the Nyquist rate. If the total number of phase samples in the sampling period is $kN^2$, where N is an integer, the implementation is the same as using a kN point DFT (discrete fourier transform) or FFT (fast fourier transform) phase filter, where only N of the filters are used in transmission and reception. The number of phase samples per filter becomes kN and the total number of phases, or elements of the code is $kN^2$. Examples of DFT and FFT filter implementation may be found in "Digital Signal Processing," by A Oppenheim and R. Schafter, Prentice Hall, 1975, herein incorporated by reference.

For example, using the Frank code, the code phases for the nth element of the mth frequency or phase group is given by $$\phi_{n,m} = 2\pi(m-1)(n-1)/kN$$

where the index n ranges from 1 to kN (an integer) for each value of m which ranges over the same values.

Figure 5:
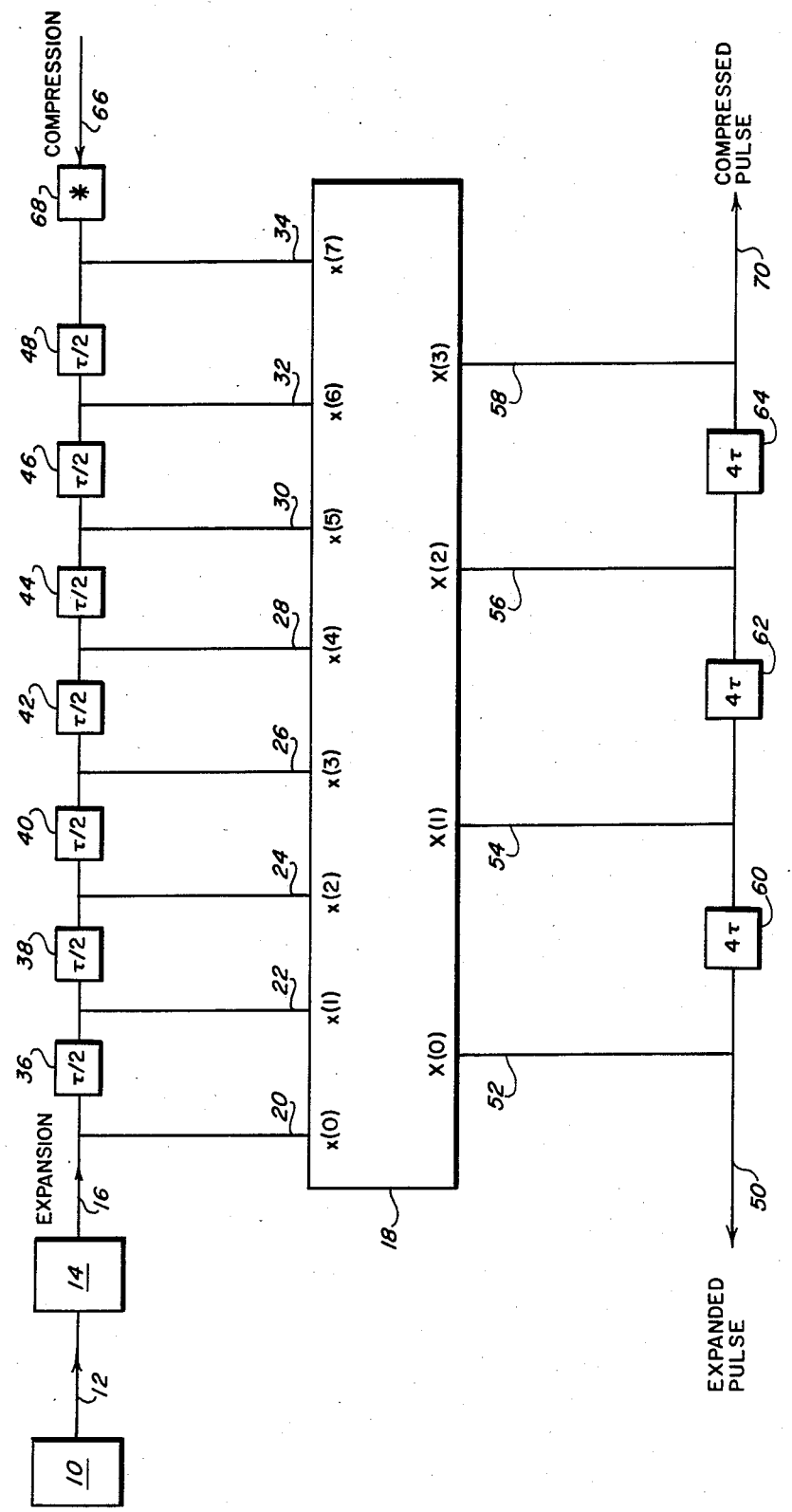
FIG. 5 is an illustration of an implementation of the present invention using an FFT to generate a 32 element compressed polyphase code sampled at twice the Nyquist rate and having a pulse compression ratio of 16.

Referring to the drawings, wherein like reference characters designate like or corresponding parts throughout the views, FIG. 5 shows a schematic for an expander/compressor using the Frank code according to the present invention for k=2 and N=4.

For expansion, a well known clocking circuit 10 generates a clock signal fed through line 12 into a well known pulse generator 14. A pulse from pulse generator 14 passes through line 16 into a well known FFT filter 18 the signal passing directly into input port 20, and with time delays into input ports 22–34 through a time delay network system 36–48, each network having a time delay corresponding to $\tau/2$, where $\tau=1/B$. FFT filter 18 generates 32 phase coded elements each having phases corresponding to consecutive samples of a chirp or step chirp waveform sampled at twice its information bandwidth B. The expanded polyphase coded signal is taken from line 50, which combines the signals from output port 52 of the FFT 18 with delayed output signals from output ports 54–58 through a time delay network system 60–64, each network having a time delay of $4\tau$, where $\tau=1/B$.

For compression, an echo signal corresponding to the expanded polyphase coded signal passes through line 66 into a well known conjugator 68. The conjugated signal output is fed directly into the input port 34 of the FFT 18, and with time delays into the input ports 20–32 through the time delay network system 36–48. The compressed polyphase coded signal is taken from line 70, which combines the signal from the output port 58 of the FFT with the delayed output signals from the output ports 52–58 through the time delay network system 60–64.

Other frequency-derived polyphase codes, such as P1, P2, P3 and P4, may be implemented using well known circuit modifications added to the above described preferred embodiment. Other embodiments, such as those using the well known "brute-force" or fast convolution techniques, also may be used with the present invention.

Figure 1:
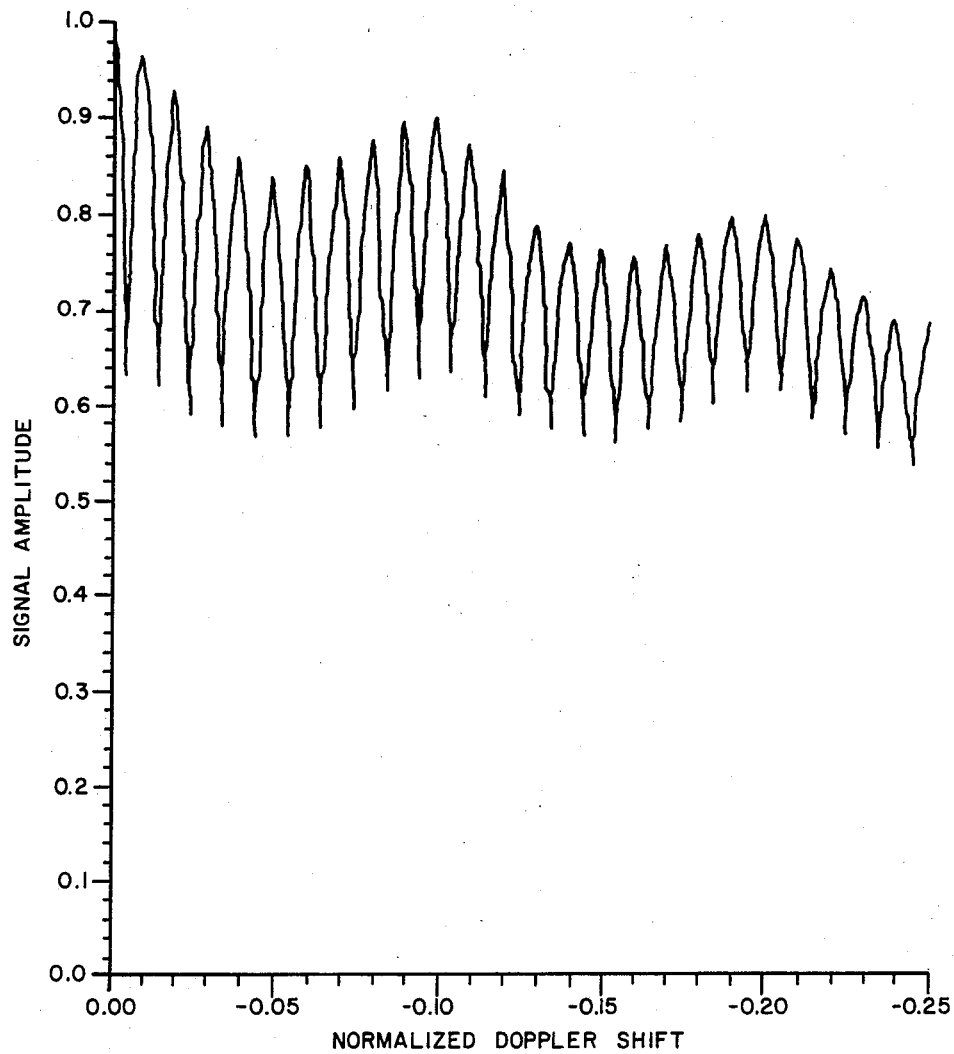
FIG. 1 is a graph which illustrates the cyclic loss in signal strength of a compressed 100 element Frank code having a pulse compression ratio of 100 as a function of normalized doppler shift.
Figure 4:
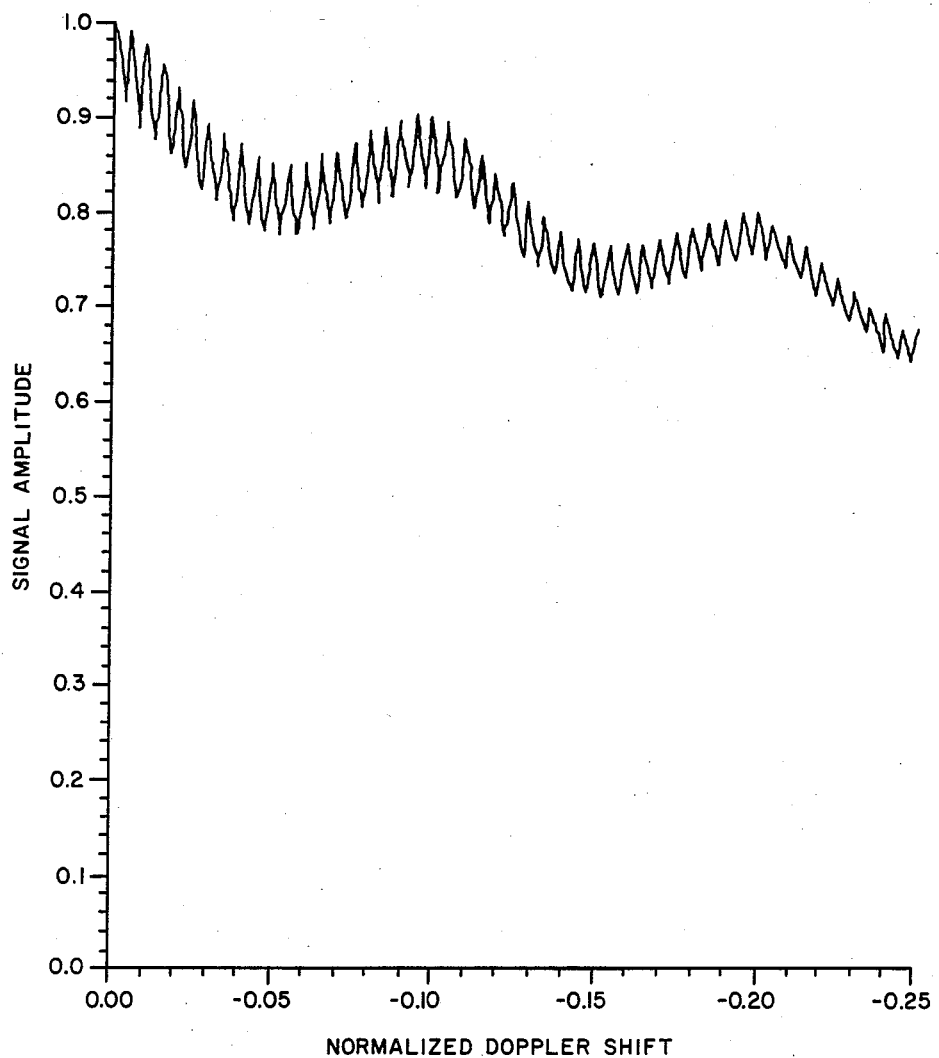
FIG. 4 is a graph which illustrates the cyclic loss in signal strength of the compressed 200 element oversampled Frank code having a pulse compression rate of 100 as a function of normalized doppler shift.

The improvement in resistance to doppler shift may be seen by comparing the output of an ordinary 100 element Frank code pulse compression system having a compression ratio of 100, as shown in FIG. 1, with a 200 element oversampled Frank code having a compression ratio of 100, as shown in FIG. 4, using sampling of the step-chirp phase characteristic at twice the sampling rate according to the present invention. Using the present invention, the peak-to-trough ratio of the output is significantly reduced, from 4 db to 0.8 db, compared with the standard pulse-compression technique.

Figure 2:
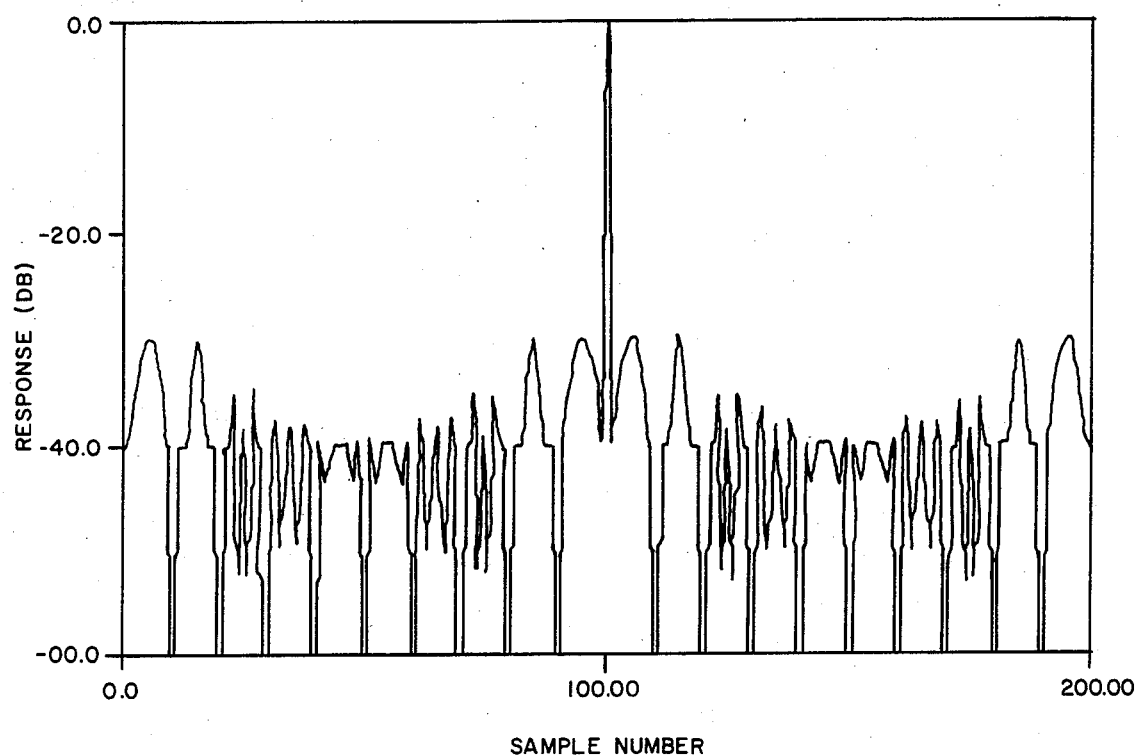
FIG. 2 is a graph which illustrates the zero doppler shift matched-filter output of a compressed 100 element Frank code having a pulse compression ratio of 100 as a function of time referenced in terms of sample number.
Figure 3:
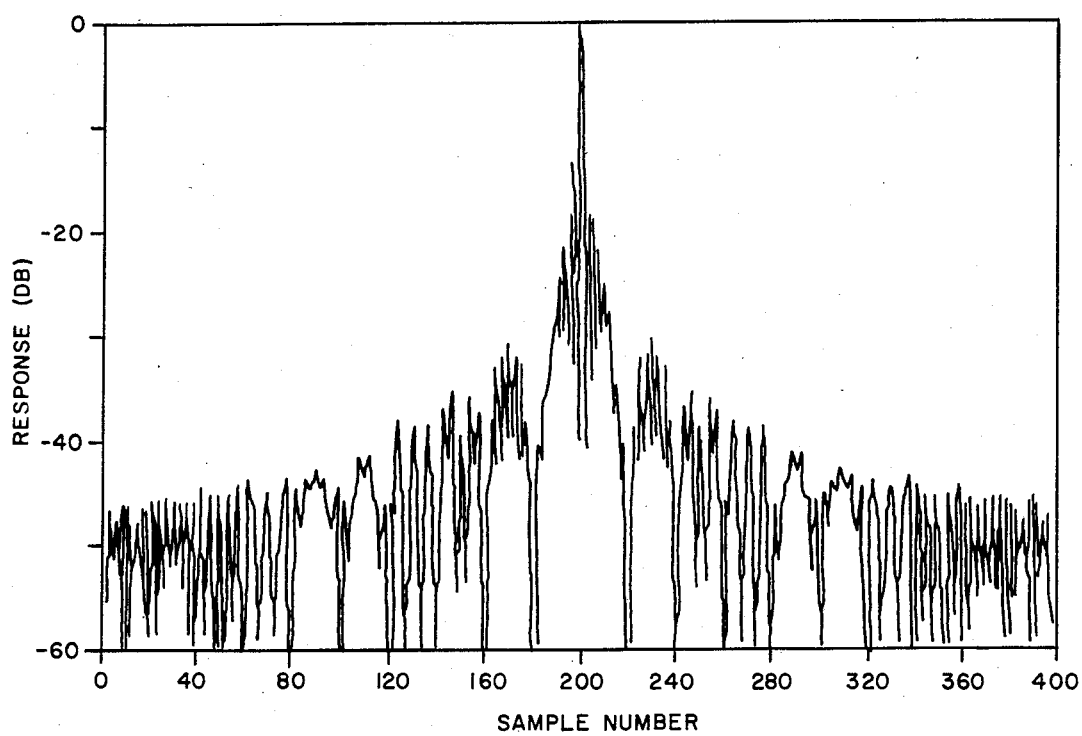
FIG. 3 is a graph which illustrates the zero doppler shift matched-filter output of a compressed 200 element oversampled Frank code whose phases are derived from the underlying step-chirp phase characteristic associated with the Frank code, which is sampled at twice the Nyquist rate, instead of being sampled at the Nyquist rate to determine the phases of the Frank code, and having a pulse compression ratio of 100 as a function of time referenced in terms of sample number.

The change in sidelobe response using the present invention may be seen by comparing the ordinary 100 element Frank code, as shown in FIG. 2, with the 200 element oversampled Frank code according to the present invention, as shown in FIG. 3. Peak sidelobes with the oversampled code are approximately 13.5 db down from the main lobe amplitude, thus approximating the response of a compressed step-chirp wave-form. These sidelobes may be reduced by decreasing the amount of oversampling or by using amplitude weighting techniques.

Since the oversampled 200 element Frank code according to the present invention has a maximum loss due to doppler shift of approximately 0.8 db and the reduction in signal to noise ratio of amplitude weighting necessary to satisfactorily reduce the peak sidelobe response is on the order of 1 db, the net improvement over the standard 100 element Frank code, which has a maximum doppler shift loss of about 4 db, is approximately 2.2 db.

It will be understood that various changes in the details, materials and arrangements of parts which have been herein described and illustrates in order to explain the nature of the invention may be made by those skilled in the art within the principle and scope of the invention as is expressed in the appended claims.

What is claimed and desired to be secured by Letters Patent of the United States is:

1. In a frequency-derived polyphase-coded expansion and compression system, a method of reducing cyclic variation in the amplitude of the compressed pulse waveform due to doppler shift, comprising:
  generating $kN^2$ phase coded elements, from a phase characteristic corresponding to a consecutive sample of a chirp waveform with an information bandwidth B, sampled at a rate having a frequency S, with $k=S/B$ and where N is an integer;
  sequencing said phase coded elements consecutively over a period corresponding to $T=N^2/B$ to form a new expanded polyphase-coded signal;
  conjugating an echo of said new expanded polyphase-coded signal to form conjugated phase coded elements, and
  combining said conjugated phase coded elements to form a compressed output signal of amplitude $N^2k$ and width $1/B$.

2. The method of reducing doppler shift variation according to claim 1, wherein said chirp waveform is a step-chirp wave form.

3. The method of reducing doppler shift variation according to claim 2, wherein said step of generating said phase coded elements further comprises generating clocked pulses.

4. The method of reducing doppler shift variation according to claim 3, wherein said step of generating said phase coded elements includes generating said elements by phase filtering each clocked pulse.

5. The method of reducing doppler shift variation according to claim 4, wherein said step of combining said conjugated phase coded elements further comprises combining said elements by storing them.

6. The method of reducing doppler shift variation according to claim 5, wherein said step of sequencing said phase coded elements further comprises sequencing said elements by storing them.

7. The method of reducing doppler shift variation according to claim 6, wherein said step of combining said conjugated phase coded elements further comprises storing said conjugated phase coded elements by delaying them.

8. The method of reducing doppler shift variation according to claim 7, wherein said step of sequencing said phase coded elements further comprises storing said phase coded elements by delaying them.

9. In a polyphase-coded expansion and compression system, a method of reducing cyclic variation in the amplitude of the compressed pulse waveform due to doppler shift, comprising:
  generating $kN^2$ phase coded elements by phase filtering clocked pulses, each of said elements from a phase characteristic corresponding to a consecutive sample of a chirp waveform with an information bandwidth B, sampled at a rate having a frequency S, with $k=S/B$ and where N is an integer;
  sequencing said phase coded elements by delaying them consecutively over a period corresponding to $T=N^2/B$ to form an expanded polyphase-coded signal;
  conjugating an echo of said expanded polyphase-coded signal to form conjugated phase coded elements, and combining said conjugated phase coded elements by filtering and delaying them to form a compressed output signal of amplitude $N^2k$ and width $1/B$.

10. The method of reducing doppler shift variation according to claim 9, wherein said chirp waveform is a step-chirp wave form.

11. In a polyphase-coded, peak-power limited radar system, an expander/compressor for polyphase-coded pulses comprising:
  signal generation means for generating $kN^2$ phase coded elements, each of said elements having a phase corresponding to a phase characteristic of a consecutive sample of a chirp waveform with an information bandwidth B, sampled at a rate having a frequency S, with $k=S/B$ and where N is an integer;
  sequencing means for sequencing said phase coded elements consecutively over a period corresponding to $T=N^2/B$ to form an expanded polyphase-coded signal;
  conjugating means for conjugating an echo of said expanded polyphase-coded signal to form conjugated phase coded elements; and
  combining means for combining said conjugated phase coded elements to form a compressed output signal of amplitude $N^2k$ and width $1/B$.

12. The polyphase expander/compressor according to claim 11, wherein said combining means includes a phase filter.

13. The polyphase expander/compressor according to claim 12, wherein said signal generation means includes a clocking circuit and a pulse generator.

14. The polyphase expander/compressor according to claim 13, wherein said signal generation means includes a phase filter.

15. The polyphase expander/compressor according to claim 14, wherein said combining means includes storage elements.

16. The polyphase expander/compressor according to claim 15, wherein said sequencing means includes storage elements.

17. The polyphase expander/compressor according to claim 16, wherein said storage elements of said combining means comprise a time delay network system.

18. The polyphase expander/compressor according to claim 17, wherein said storage elements of said sequencing means comprise a time delay network system.

19. In a polyphase-coded, peak-power limited radar system, an expander/compressor for polyphase-coded pulses comprising:
  signal generation means for generating $kN^2$ elements with a clocking circuit, a pulse generator and a phase filter, each of said elements having a phase corresponding to a consecutive sample of a chirp waveform with an information bandwidth B, sampled at a rate having a frequency S, with $k=S/B$ and where N is an integer;
  sequencing means, including storage elements comprising a delay network system, for sequencing said phase coded elements consecutively over a period corresponding to $T=N^{2}B$ to form an expanded polyphase-coded signal;
  conjugating means for conjugating an echo of said expanded polyphase-coded signal to form conjugated phase coded elements; and
  combining means, including a phase filter and storage elements comprising a delay network system for combining said conjugated phase coded elements to form a compressed output signal of amplitude $N^2K$ and width $1/B$.

* * * * *